United States Patent
Sugano

[11] Patent Number: 6,144,503
[45] Date of Patent: Nov. 7, 2000

[54] PROJECTION LENS AND FOCUS ADJUSTING METHOD FOR PROJECTION LENS

[75] Inventor: Yasuyuki Sugano, Tokyo, Japan

[73] Assignee: Sony Corporation, Tokyo, Japan

[21] Appl. No.: 09/294,380

[22] Filed: Apr. 20, 1999

[30] Foreign Application Priority Data

Apr. 24, 1998 [JP] Japan .................................. 10-115204

[51] Int. Cl.[7] .......................... G02B 13/04; G02B 13/22; G02B 17/00; G02B 9/12
[52] U.S. Cl. ......................... 359/749; 359/663; 359/726; 359/784
[58] Field of Search .................................. 359/649–651, 359/663, 676, 680, 682, 683, 687, 689, 726, 784, 749

[56] References Cited

U.S. PATENT DOCUMENTS

| | | | |
|---|---|---|---|
| 4,526,442 | 7/1985 | Betensky et al. | 359/649 |
| 5,278,698 | 1/1994 | Iizuka et al. | 359/682 |
| 5,331,462 | 7/1994 | Yano | 359/689 |
| 5,760,965 | 6/1998 | Kim | 359/651 |
| 5,870,228 | 2/1999 | Kreitzer et al. | 359/649 |

*Primary Examiner*—Georgia Epps
*Assistant Examiner*—David N. Spector
*Attorney, Agent, or Firm*—Jay H. Maioli

[57] ABSTRACT

A projection lens which has a wide angle view, a short projection distance and telecentricity, and in which the projection can be performed with high contrast, various aberrations such as a distortion aberration are reduced and the optical path is converted by providing a first lens group having negative refractive power and second and third lens groups having positive refractive power are arranged from a longer conjugate side. Representing a back focus at a projection distance of an infinite point by BF; the composite focus distance of the entire system by F; a center distance between said first lens group and said second lens group by GD1; the composite focus distance of said first lens group by F1; the composite focus distance of said second lens group and said third lens group by F23; and the center distance between said second lens group and said third lens group by GD2, the following relationships are satisfied:

$[2.8 < BF/F]$, $[3.0 < GD1/F < 4.50]$, $[0.40 < -F1/F23 < 0.48]$, and $[0.40 < GD2/F23 < 0.8]$.

At this time, the focus adjustment is carried out by moving the first lens group along the optical axis OA.

10 Claims, 16 Drawing Sheets

LENS CROSS-SECTIONAL VIEW (SECOND EMBODIMENT)

FIG.8 LENS CROSS-SECTIONAL VIEW (THIRD EMBODIMENT)

FIG.9

<FIRST EMBODIMENT>
1:1.92/11.58mm

| m | Ri | Di | NDi | VDi |
|---|---|---|---|---|
| 1 | 49.35688 | 2.3553 | 1.49150 | 58.00 |
| 2 | 21.61872 | 15.4201 | | |
| 3 | 217.74215 | 2.0609 | 1.75000 | 45.21 |
| 4 | 21.95604 | D4 | | |
| 5 | 81.33394 | 16.6377 | 1.80518 | 25.43 |
| 6 | -84.37256 | 28.2505 | | |
| 7 | -35.74903 | 1.5310 | 1.80518 | 25.43 |
| 8 | 33.17729 | 8.8616 | 1.64616 | 58.07 |
| 9 | -54.53064 | 0.2000 | | |
| 10 | 42.57604 | 14.3743 | 1.59990 | 60.92 |
| 11 | -54.05548 | 0.2771 | | |
| 12 | 629.09991 | 5.2549 | 1.49150 | 58.00 |
| 13 | -45.18908 | D13 | | |

<ASPHERICAL COEFFICIENT>

FIRST PLANE
K    =-0.47464
A4   = 0.14340E-04
A6   =-0.34338E-08
A8   =-0.80073E-11
A10  = 0.65494E-14

SECOND PLANE
K    =-0.23512
A4   = 0.11459E-04
A6   = 0.48909E-08
A8   = 0.29653E-10
A10  =-0.17293E-12

TWELFTH PLANE
K    =-1.00000
A4   =-0.20082E-04
A6   =-0.34030E-07
A8   = 0.27472E-10
A10  = 0.28445E-13

THIRTEENTH PLANE
K    =-0.39940
A4   =-0.95186E-05
A6   =-0.24828E-07
A8   = 0.34574E-10
A10  =-0.17673E-14

| PROJECTION DISTANCE | D4 | D13 |
|---|---|---|
| D0= ∞ | 37.2311 | 33.6847 |
| D0=500 (OVERALL EXTENSION) | 37.2311 | 33.9383 |
| D0=500 (FIRST GROUP EXTENSION) | 33.0166 | 33.6847 |

FIG.10

<SECOND EMBODIMENT>
1:1.92/11.60mm

| m | Ri | Di | NDi | VDi |
|---|---|---|---|---|
| 1 | 53.31848 | 3.0000 | 1.49150 | 58.00 |
| 2 | 23.48516 | 16.9805 | | |
| 3 | 328.23019 | 2.5000 | 1.74400 | 44.78 |
| 4 | 25.10796 | $D_4$ | | |
| 5 | 65.39447 | 5.0654 | 1.80518 | 25.43 |
| 6 | -106.00730 | 26.4345 | | |
| 7 | -29.20332 | 1.8000 | 1.80518 | 25.43 |
| 8 | 29.20332 | 10.0919 | 1.60311 | 60.70 |
| 9 | -48.49440 | 0.2000 | | |
| 10 | 38.56376 | 14.7820 | 1.51633 | 64.15 |
| 11 | -39.56376 | 0.2000 | | |
| 12 | INS | 5.9980 | 1.49150 | 58.00 |
| 13 | -42.26900 | $D_{13}$ | | |

<ASPHERICAL COEFFICIENT>

FIRST PLANE
K     = 0.48551E+00
A4    =-0.26766E-06
A6    = 0.18128E-07
A8    =-0.20471E-10
A10   = 0.66771E-14

SECOND PLANE
K     =-0.18969E+00
A4    =-0.48423E-05
A6    = 0.14722E-07
A8    = 0.50788E-10
A10   =-0.13109E-12

TWELFTH PLANE
K     =-1.00000E+00
A4    =-0.21903E-04
A6    =-0.30473E-07
A8    = 0.33959E-10
A10   = 0.40337E-13

THIRTEENTH PLANE
K     =-0.64573
A4    =-0.98181E-05
A6    =-0.19722E-07
A8    = 0.45141E-10
A10   = 0.57793E-14

| PROJECTION DISTANCE | $D_4$ | $D_{13}$ |
|---|---|---|
| $D_0 = \infty$ | 47.3477 | 33.6821 |
| $D_0 = 500$ (OVERALL EXTENSION) | 47.3477 | 33.9352 |
| $D_0 = 500$ (FIRST GROUP EXTENSION) | 48.3179 | 33.6821 |

FIG.11

<THIRD EMBODIMENT>
1:1.92/11.60mm

| m | Ri | Di | NDi | VDi |
|---|---|---|---|---|
| 1 | 55.44633 | 3.0000 | 1.49150 | 58.00 |
| 2 | 23.49790 | 15.8313 | | |
| 3 | 247.47359 | 2.5000 | 1.74400 | 44.78 |
| 4 | 23.80605 | $D_4$ | | |
| 5 | 62.97059 | 6.4239 | 1.80518 | 25.43 |
| 6 | -116.53469 | 26.2012 | | |
| 7 | -30.53356 | 1.8000 | 1.80518 | 25.43 |
| 8 | 30.53366 | 7.8027 | 1.60311 | 60.70 |
| 9 | -57.40403 | 0.2000 | | |
| 10 | 35.95753 | 10.1507 | 1.51633 | 64.15 |
| 11 | -35.95753 | 0.4214 | | |
| 12 | INF | 6.0000 | 1.49150 | 58.00 |
| 13 | -42.26899 | $D_{13}$ | | |

<ASPHERICAL COEFFICIENT>

FIRST PLANE
K  = 1.00000
A4 =-0.65950E-06
A6 = 0.18292E-07
A8 =-0.21968E-10
A10 = 0.87088E-14

SECOND PLANE
K  =-0.24716
A4 =-0.81541E-05
A6 = 0.34795E-07
A8 =-0.67601E-11
A10 =-0.66001E-13

TWELFTH PLANE
K  =-1.00000
A4 =-0.27608E-04
A6 =-0.41289E-07
A8 = 0.30530E-10
A10 = 0.10802E-12

THIRTEENTH PLANE
K  = 0.94464E-01
A4 =-0.11963E-04
A6 =-0.26222E-07
A8 = 0.62821E-10
A10 = 0.21418E-13

| PROJECTION DISTANCE | $D_4$ | $D_{13}$ |
|---|---|---|
| $D_0 = \infty$ | 47.3477 | 33.6820 |
| $D_0=500$ (OVERALL EXTENSION) | 43.3477 | 33.9358 |
| $D_0=500$ (FIRST GROUP EXTENSION) | 48.2690 | 33.6820 |

VARIOUS ABERRATION DIAGRAMS
(FIRST EMBODIMENT ; FIRST LENS GROUP EXTENSION SYSTEM)

VARIOUS ABERRATION DIAGRAMS
(THIRD EMBODIMENT ; OVERALL EXTENSION)

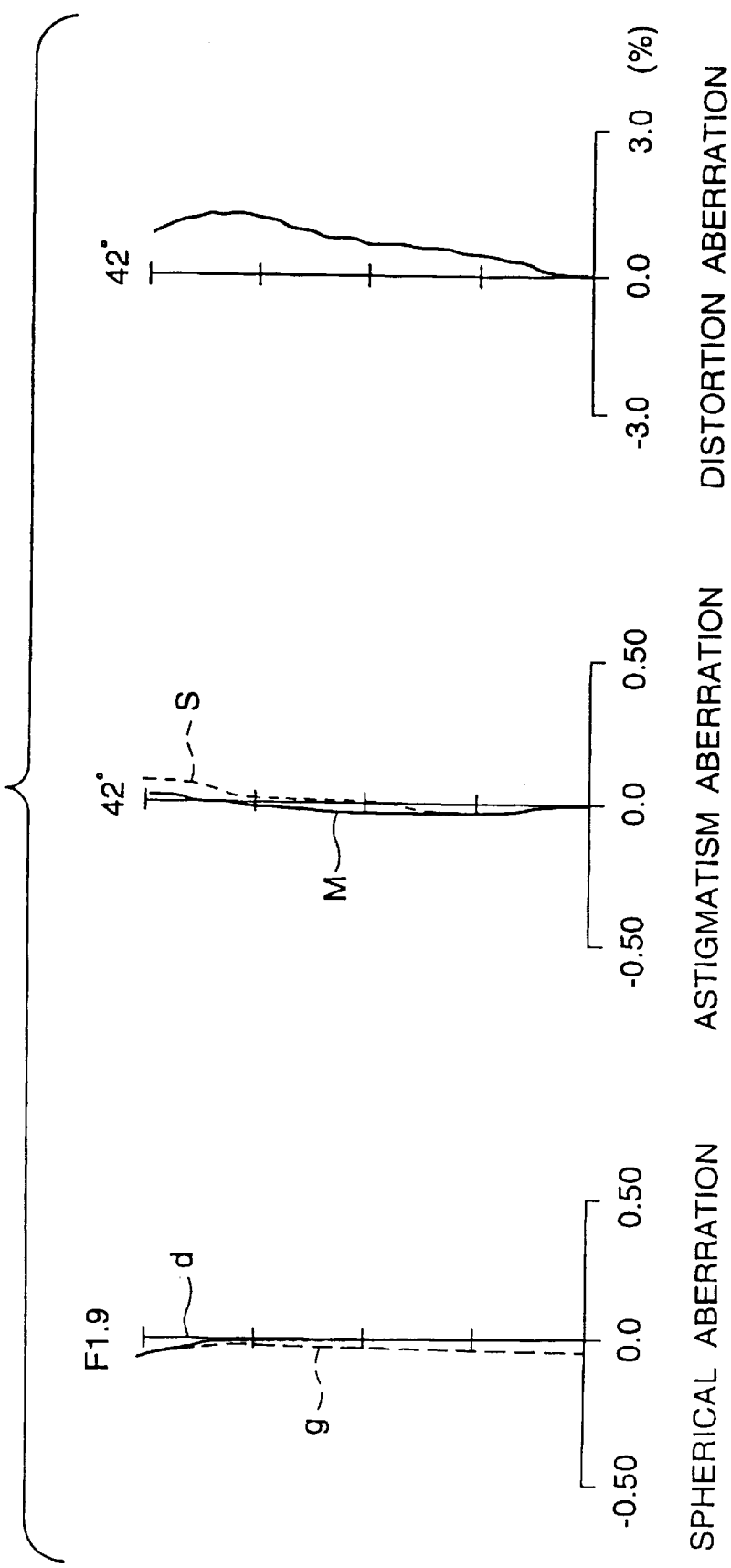

PROJECTION LENS AND FOCUS ADJUSTING METHOD FOR PROJECTION LENS

BACKGROUND OF THE INVENTION

1. Field of the Invention

The present invention relates to a projection lens, and is suitably applied to a projection lens equipped to a projection device such as a projection display device.

2. Description of the Related Art

Recently, a projection display device has been widely used.

A projection display device as described above is known as a so-called back projection type projection display device and performs a display operation by projecting image light to a transmission type screen from the back side thereof.

In such a back projection type projection display device, a beam of light obtained by collimating light of a white light source by a reflector or the like is decomposed into three-color light of red, green and blue components by a color-separating mirror.

The light beams of three colors are each incident on a two-dimensional image display element, for example, a Liquid Crystal Display (LCD), which is formed according to a video electrical signal of red, green, blue (R, G, B). Image light obtained on the respective two-dimensional image display elements corresponding to red, green and blue is color-composed into white color in a color composing optical system, and projected onto a transmission type screen through a projection lens while being enlarged.

A large number of wide-angle type photographic lenses of the kind used for single-lens reflex cameras, each having a long back focus, have been proposed as wide-angle projection lenses for CRT-based projection televisions.

Further, there is a case where the projection display device has a structure that bends the an optical path by 90°.

With this structure, the arrangement direction of the housing of a projection display device and the mounting direction of various optical elements, from the color separation to the color composition, can be changed, and further the various optical elements can be miniaturized, whereby miniaturization of the projection display device is made possible.

In the construction of the projection display device as described above, a so-called back focus, which corresponds to the distance from the two-dimensional image display element to the rear end of the projection lens, must nescessarily be a long distance because of the necessity of arranging the optical elements, such as a dichroic prism, a dichroic mirror or the like.

Further, when an enlarged image is formed on the overall transmission type by a projection display device, it is required to shorten the projection distance, that is, the central light beam length extending from the emission end of the projection lens through the mirror to the transmission type screen, in order to miniaturize the projection display device itself. In order to satisfy this requirement, it is necessary that the projection lens have a wider angle and the divergence angle of the emitted light is increased, thereby resulting in a large overall size. Further, in order to transmit light from a light source through the two-dimensional image display element and display an image with high contrast on a screen while the image is enlarged, the beams of light emitted from the two-dimensional image display element must be at an angle that is nearly vertical.

Still further, in order to reduce nonuniformity of color on the screen onto which the image is projected, it is desirable to make constant the angle width of the light beams impinging on the coat face of a dichroic prism or dichroic mirror.

Accordingly, it is necessary that the projection lens has telecentricity so that the principal ray on the axis of the projection lens is vertical relative to the two-dimensional image display element. In this case, however, the lens is symmetrical with respect to the light beam passing the center of the two-dimensional image display element, whereas the two-dimensional image display element itself has a higher contrast in only one direction, so that the light beam irradiated to the two-dimensional image display element is required to be at an angle.

A display device such as LCD or the like is ordinarily used as the two-dimensional image display element, and unlike the case when using a CRT, it is difficult to correct distortion of the projection lens because an LCD is driven by using a matrix of electrodes. That is, in the case of the CRT, the distortion of the projection can be relatively easily corrected by using a raster-shaped correction function such as a pin-cushion distortion correction or the like. On the other hand, in the case of the display device for performing dot matrix display such as an LCD, such a raster distortion correction is not ordinarily performed.

From the above situation, it is preferable to reduce the distortion aberration of the projection lens as much as possible. However, this is an obstacle to a wide-angle design of a projection lens and to achieving a long back focus.

That is, it is known that if telecentricity is provided to a projection lens while the wide-angle design and the long back focus are secured, this tends to increase the overall length of the lens and increase the lens diameter.

Further, since the back focus is insufficient and the incidence angle and emission angle of the light beam on the axis are acute in a wide-angle photographic lens for a single-lens reflex camera and a projection lens for a CRT-based projection television, there is no telecentricity and the light output is reduced.

Further, in the case of the projection display device using the construction of bending the optical path of the projection lens, it is known that if a so-called overall extension system to achieve the focus position by adjusting the relative distance between the projection lens and the screen is used as a focus adjusting system, the image center on the screen is deviated and, thus, is not suitable. Accordingly, in the projection display device, it is necessary to use a suitable focus adjusting method other than the overall extension system.

SUMMARY OF THE INVENTION

The present invention provides a projection lens for performing an optical path conversion in a system of the projection lens, which has a wide view angle, a long back focus and a large out-of-axis light amount at a short projection distance and telecentricity, and also has small distortion aberration and small other aberrations. Further, the present invention enables a focus adjustment which is suitable for a case where the optical path conversion is performed in the system of the projection lens.

The invention provides a projection lens in an arrangement of a first lens group having a refractive power and an aspherical surface, a second lens group which has a positive refractive power so as to be spaced at the largest center distance in the overall system and is formed so as to have at least one positive lens, and a third lens group having a positive refractive power and an aspherical surface, which are arranged from a long conjugate side to a short conjugate side, optical path conversion means which is inserted between the first lens group and the second lens group and converts an optical path of the light flux that extends from the first lens group to the second lens group.

A back focus at a projection distance of infinite point is represented by BF; the composite focus distance of the entire system by F; the center distance between said first lens group and the second lens group by GD1; the composite focus distance of the first lens group by F1; the composite focus distance of the second lens group and the third lens group by F23 and the center distance between the second lens group and the third lens group by GD2; the following equation is satisfied:

$2.8 < BF/F$ $3.0 < GD1/F < 4.50$ $0.40 < -F1/F23 < 0.48$ $0.40 < GD2/F23 < 0.8$

Accordingly, a space in which the optical path conversion means can be disposed is maintained between the first lens group and the second lens group, and an inverse telescope type lens construction can be obtained as a wide-angle lens having a long back focus. Further, the construction is made so that the out-of-axis principal light beam is emitted to the high position of the third lens group, whereby the telecentricity of the out-of-axis principal light beam incident to the face of a two-dimensional image display element such as a liquid crystal panel or the like can be obtained.

According to the present invention, as the projection lens having optical path conversion means, a wide-angle lens having a long back focus which is needed, for example, when a projection lens is used for a projection display device, can be formed, and an inverted telescope type lens construction can be obtained. That is, a large-size screen can be obtained with a short projection distance.

Furthermore, according to the present invention, a third lens group having at least a laminated lens and a positive lens and having an aspherical surface lens at the shortest conjugate side, represents the composite focus distance of the third lens group by F3; the composite focus distance of the laminated lens of the third lens group by F31; the composite focus distance of the positive lens of the third lens group by FP32; the composite focus distance of the positive lens and the aspherical surface lens of the third lens group by F32; and the composite focus distance of the aspherical surface lens of the third lens group by FP33, so that the following equation is satisfied:

$1.00 < -F31/F3 < 2.50$ $0.9 < FP32/F3 < 1.40$ $2.00 < -FP33/F32$

Accordingly, the balance of the refractive power of the positive lens constituting the laminated lens in the third lens group, the balance of the refractive power of the positive lens in the third lens group and the balance of the refractive power of the aspherical lens in the third lens group are defined, and an excellent correction of various aberrations can be achieved.

Simultaneously, it is so adapted that also an easiness in working each lens is ensured.

The laminated lens of the third lens group is composed of a negative lens and a positive lens in the direction from a long conjugate side to a short conjugate side, and representing the refractive index of a negative lens constituting the laminated lens of the third lens group by N3N; the refractive index of a positive lens constituting the laminated lens of the third lens group by N3P; the Abbe number of a positive lens constituting the laminated lens of the third lens group by V3P; and the Abbe number of a negative lens constituting the laminated lens of the third lens group by V3N, the following equation is satisfied:

$N3N-N3P < 0.15$ $V3P-V3N < 27$

Whereby a suitable value is obtained as the refractive index of the laminated lens in the third lens group to enable a suitable color correction.

The optical path conversion means is provided so that an optical path is bent along a long side of a two-dimensional image display element to be disposed at the focus position of the entire system of the projection lens, or it is provided so that an optical path is bent along a short side of a two-dimensional image display element to be displaced at the focus position of the entire system of the projection lens, whereby the setting of the arrangement direction in the projection display device of the projection device having the projection lens can be changed.

As a result, it becomes possible to aim at reducing the housing size of the projection display device equipped with the projection lens of the present invention.

The optical path conversion means is composed of a mirror or prism for totally reflecting only P-wave or S-wave. Therefore, there can be supported at a low cost a case where the projection device having the projection lens concerned is designed to handle light of a polarization plane of any one of P-wave and S-wave.

That is, according to the present invention, there is implemented a projection lens for performing therein the optical conversion, which can project with high contrast especially in a projection device using a liquid crystal panel, which has a wide angle, a short projection distance, a long back focus and a telecentricity, and further which is reduced in various aberrations such as distortion aberration, etc.

And, for example, when the projection display device is constructed by applying the projection lens of the present invention to a projection device using a liquid crystal panel as a two-dimensional image display element, a thin display whose depth, etc. are reduced correspondingly can be obtained, and also an excellent image quality is obtained.

According to the present invention, as a focus adjusting method for a projection lens in which in an arrangement of a first lens group having a refractive power and an aspherical surface, a second lens group which has a positive refractive power so as to be arranged at the largest center distance in the overall system and is formed so as to have at least one positive lens, and a third lens group having a positive refractive power and an aspherical surface, which are arranged from a long conjugate side to a short conjugate side, optical path conversion means which is inserted between the first lens group and the second lens group and converts an optical path of light flux which is to extend from the first lens group to the second lens group is provided, and representing a back focus at a projection distance of infinite point by BF; the composite focus distance of the entire system by F; the center distance between the first lens group and the second lens group by GD1; the composite focus distance of the first lens group by F1; the composite focus distance of the second lens group and the third lens group by F23 and the center distance between the second lens group and the third lens group by GD2, the following equation is satisfied:

$$2.8 < BF/F$$

$$3.0 < GD1/F < 4.50$$

$$0.40 < -F1/F23 < 0.48$$

$$0.40 < GD2/F23 < 0.8$$

The focus position at the long conjugate side of the projection lens is adjusted by moving the first lens group along the optical axis.

That is, in the adjustment method of the present invention, the focus adjustment of the light flux focused on the screen which is arranged, for example, at the long conjugate side, is performed by the lens group through which the light passes after the optical path is converted by the optical path conversion means.

For example, as in case of using a so-called overall extension system, the focus adjustment work can be easily performed without inducing the phenomenon that the image center deviates on the screen.

BRIEF DESCRIPTION OF THE DRAWINGS

FIG. 9 is a diagram showing a numerical embodiment of the projection lens of the first embodiment.

FIG. 10 is a diagram showing a numerical embodiment of the projection lens of the second embodiment.

FIG. 11 is a diagram showing a numerical embodiment of the projection lens of the third embodiment.

FIG. 17 is an aberration diagram showing the spherical aberration, astigmatism aberration and distortion aberration of the projection lens when the first lens group extension system is used as the third embodiment.

DETAILED DESCRIPTION OF THE PREFERRED EMBODIMENTS

A projection lens according to an embodiment of the present invention will be described hereunder. The description is made on the assumption that the projection lens of this embodiment is for a back projection type projection display device using LCD as a two-dimensional image display element.

1. Construction of Projection Display Device 1-1. Overall Construction

First, the overall construction of the projection display device which is designed to be equipped with a projection device having a projection lens of this embodiment will be described.

Figure 1:
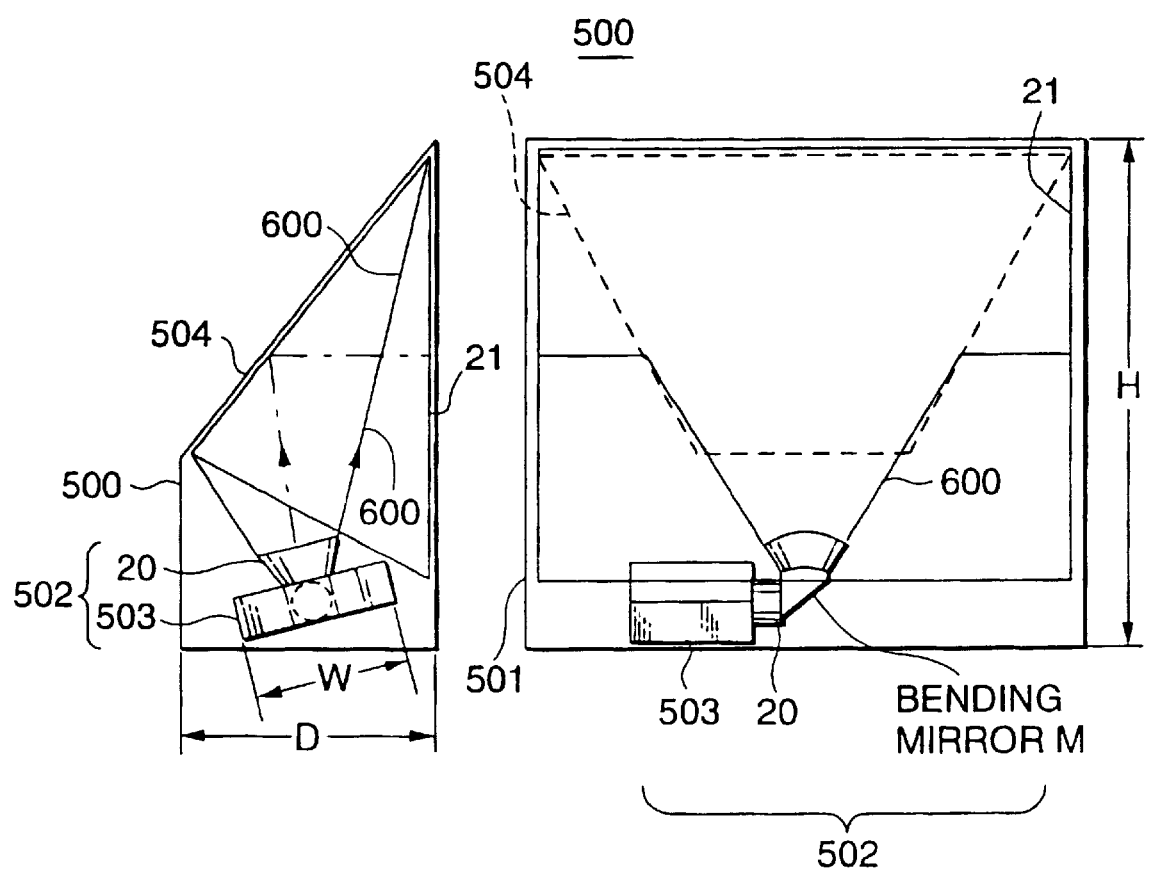
FIG. 1A and FIG. 1B are diagrams showing the overall construction of a projection display device having a projection lens according to an embodiment of the present invention.

FIG. 1A and FIG. 1B are a side view and a front view of an example of the overall construction of the projection display device.

A projection display device 500 shown in these figures is provided with a light bending mirror 504 on the back surface of a cabinet 501, and a transmission type screen 21 is provided an the front surface of the cabinet 501. The bending mirror 504 is secured at an angle at which image light projected from a projection device which will be next described can be reflected and projected to the screen 504.

The projection device 502 is disposed at the lower side in a cabinet 501 as shown in the FIGS. 1A and 1B.

A light source, a dichroic mirror, a liquid crystal panel block and optical parts such as a dichroic prism (light composition element), etc. are disposed in the cabinet 503 of the projection device 502, and light is obtained as image light by the operation of the above elements. The image light thus obtained is projected by a projection lens 20 and emitted as projection light 600.

In this embodiment, a bending mirror M for converting the direction of the optical path is disposed in the optical path of the lens system constituting the projection lens 20. Accordingly, in this embodiment, as the image light beam is bent at the projection lens 20.

In the projection display device 500 thus constructed, the projection light 600 is emitted upwardly from the projection lens 20 so as to be irradiated onto the bending mirror 504. The optical path of the projection light 600 emitted from the projection lens 20 is bent by the bending mirror 504, and irradiated to the screen 21.

On the screen 21 is disposed an enlarged image obtained by the light from the projection lens 20. For example, a viewer views the screen 21 from the opposite direction to that of the projection lens 20 to enjoy the displayed image.

The method of converting the direction of the optical path in the projection lens 20 as shown in FIG. 1B is mainly used to miniaturize the size of the cabinet 501 of the projection display device 500.

That is, in the case of FIGS. 1A and 1B, the optical path of the image light beam in the cabinet 503 of the projection device 502 is converted upwardly by 90° by the projection lens 20. Accordingly, the cabinet 503 itself of the projection device 502 is substantially flat, as is apparent from the illustration of FIG. 1A, and has an obliquely arranged rear wall so that the projection light 600 is suitably irradiated to the bending mirror 504.

Accordingly, as compared with the case where the optical path is not changed in direction by the projection lens 20, the depth D of the cabinet 501 of the projection display device 500 can be reduced. Further, since the space of a portion at the lower side of the screen 21 in the cabinet 501 of the projection display device 500 can be reduced, the height H of the cabinet 501 can be reduced.

The projection display device for which the present invention is used is not limited to the construction shown in FIGS. 1A and 1B, and the manner in which the projection device is mounted in the cabinet of the projection display device may be suitably changed in accordance with the optical path conversion direction in the projection lens of the projection device.

1-2. Internal Construction of Projection Device (First Embodiment)

Subsequently, the internal construction of the projection device 502 shown in FIGS. 1A and 1B will be described with reference to FIG. 2.

Figure 2:
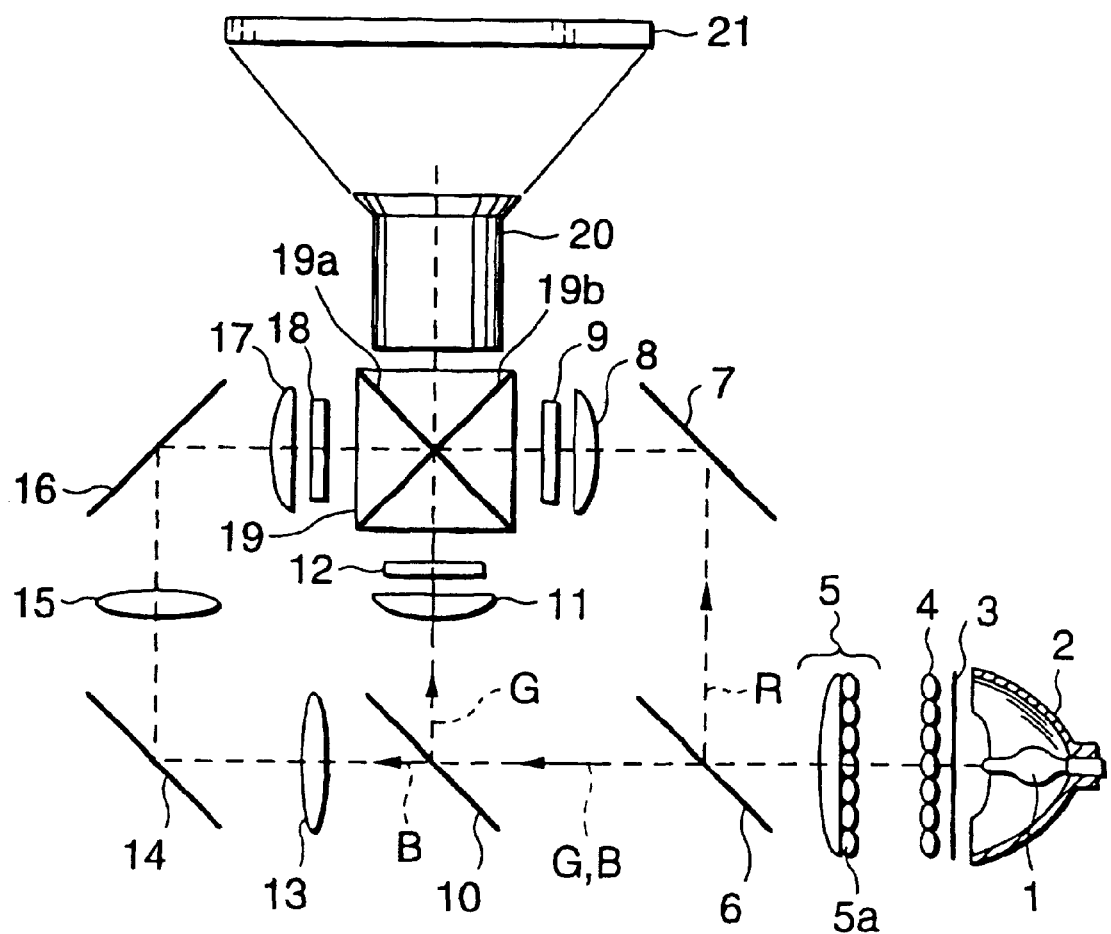
FIG. 2 is a diagram showing the construction of a first embodiment of the projection device having the projection lens of the present invention.

FIG. 2 conceptually shows the internal construction of a first embodiment as the projection device 502 in which the projection lens can be mounted. In this case, the portions other than the screen 21 constitute the projection device 502.

In this embodiment, as shown in FIGS. 1A and 1B, a bending mirror 504 is provided between the projection lens 20 and the screen 21 to change the direction of the light beam, and the optical path is further converted by another bending mirror in the projection lens 20. In this case, since main attention is paid to the description of the internal construction of the projection device 502, both of the bending mirror 504 in FIGS. 1A and 1B and the structure corresponding to the optical path conversion mirror of projection lens 20 are omitted from the illustration of FIG. 2.

As the projection device shown in FIG. 2, a lamp 1 as a light source comprising a metal halide lamp or the like is disposed at a focus position of a reflector 2 (parabolic plane mirror). Light irradiated from the lamp 1 is reflected from the reflector 2 and collimated to be substantially parallel to the optical axis, and then emitted from the opening portion of the reflector 2.

Undesired light beams in the infrared area and the ultraviolet area in the light emitted from the opening portion of the reflector 2 are intercepted by an IR-UV cut filter 3, and only light beams which are effective to display are guided to various optical elements disposed at subsequent stages.

At the subsequent stage of the IR-UV cut filter 3, a second multi-lens array 5 is disposed after a multi-lens array 4.

In this case, the multi-lens array 4 is designed in a flat shape from a plurality of convex lenses whose outlook is similar to a shape having the same aspect ratio as the effective opening of each liquid crystal panel serving as the optical modulation means described below are arranged in a zigzag form and are deviated in phase by ½ a lens pitch.

The second multi-lens array 5 is designed in a flat form so that a plurality of convex lenses 5a are formed at the side thereof which confronts the convex lenses of the first multi-lens array 4.

By arranging the first multi-lens array 4 and the second multi-lens array 5, light passing through the IR-UV cut filter 3 can be efficiently and uniformly irradiated to the effective opening of the liquid crystal panel block described below.

Dichroic mirrors 6 and 10 for separating the light from the lamp 1 into red, green and blue colors are disposed between the multi-lens array 5 and the effective opening of the liquid crystal panel block liquid crystal.

In the case shown in the figures, the red color light R is first reflected by the dichroic mirror 6, and the green color light G and the blue color light B are transmitted therethrough. The propagation direction of the red color light R which is reflected by the dichroic mirror 6 is bent by 90° by the mirror 7, and then guided to a condenser lens 8 before the liquid crystal panel block 9 for red.

On the other hand, the green and blue color light G, B transmitted through the dichroic mirror 6 are separated by another dichroic mirror 10. That is, the green color light G is reflected to bend the propagation direction thereof by 90° and then guided to a condenser lens 11 before the green liquid crystal panel 12. The blue color light B is transmitted through the dichroic mirror 10, propagated straight ahead, and then is guided through a relay lens 13, a mirror 14, an inverting relay lens 15 and a mirror 16 to a condenser lens 17 before the blue liquid crystal panel 18.

As described above, each of the red, green and blue light beams R,G,B is transmitted through a respective condenser lens 8, 11, 17 and incident to the liquid crystal panel block 9, 12, 18 for each color.

Each color liquid crystal panel block 9, 12, 18 is provided with a liquid crystal panel, and also with an incident side polarizer for aligning the polarization direction of the light beams incident to the front stage of the liquid crystal panel to a fixed direction. Further, a so-called analyzer for passing therethrough only light having a predetermined polarization plane in emitted light is disposed at the subsequent stage of the liquid crystal panel, whereby the light intensity is modulated by a voltage of a circuit for driving the liquid crystal.

In general, reflection and transmission characteristics of P-polarization plane are used in order to effectively use the characteristics of the dichroic mirrors 6, 10. Accordingly, the incident side polarizer in each liquid crystal panel block 9, 12, 18 is disposed so that the polarization plane parallel to the sheet of FIG. 2 is transmitted therethrough.

Further, for example, a TNT type liquid crystal panel is used for the liquid crystal panel blocks 9, 12, 18, and the operation thereof is set to a so-called normally white type. The analyzer is disposed so that polarized light perpendicular to the sheet of FIG. 2 is transmitted.

Each color light flux which is optically modulated by the liquid crystal panel block 9, 12, 18 is incident to each face shown in the figure in the light composition element 19. This light composition element 19 is formed by as a cross dichroic prism combining two prisms having a predetermined shape with resepective reflection films 19a, 19b.

The red color light R in the light composition element is reflected from the reflection film 19a, the blue color light B is reflected from the reflection film 19b, and they are directed to the projection lens 20. The green color light G propagates directly through the light composition element 19 and is incident on the projection lens 20, whereby the light beam R, the light beam G and the light beam B are incident to the projection lens 20 while being composed into one light beam.

In the projection lens 20, the light beams incident from the light composition element 19 are converted to projection light and projected to the transmission type screen 21.

In this embodiment, after the optical path direction is converted by 90° in the projection lens 20, it is reflected by the bending mirror 504 disposed in the projection display device and then the composite light beam is irradiated to the screen 21.

1-3. Internal Construction of Projection Device (Second Embodiment)

Figure 3:
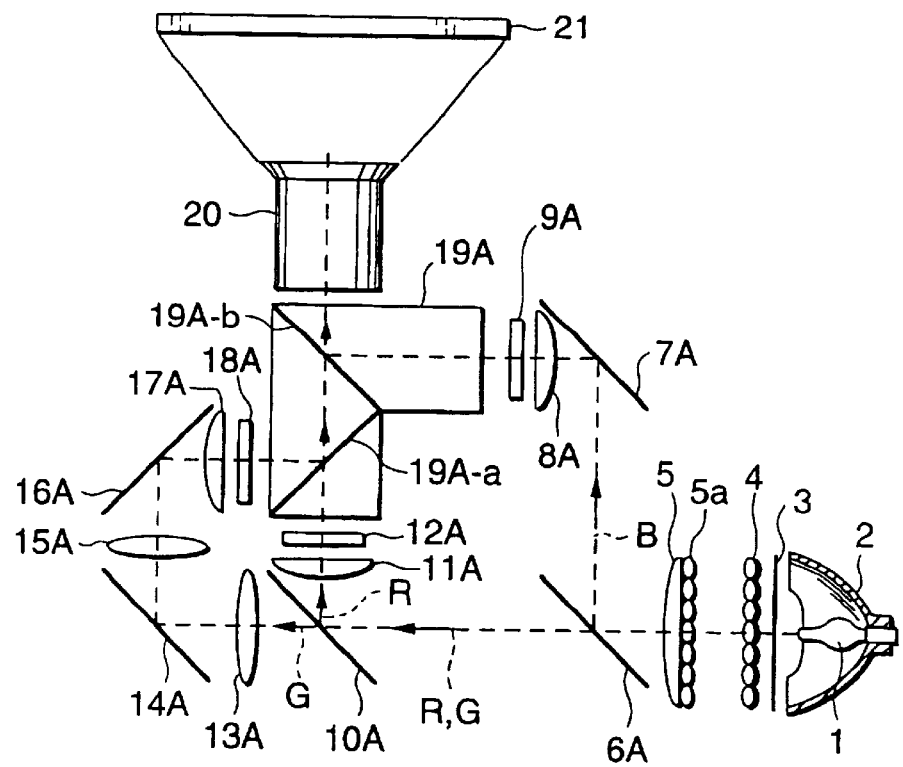
FIG. 3 is a diagram showing the construction of a second embodiment of the projection device having the projection lens of the present invention.

FIG. 3 conceptually shows the internal construction as a second embodiment of the projection device 502 in which the projection lens of this embodiment can be mounted. In FIG. 3, the same parts as FIG. 2 are represented by the same reference numerals, and the description thereof is omitted.

In this case, the light beam B is reflected by a dichroic mirror 6A after the second multi-lens array 5, and the light beam R, the light beam G are allowed to pass.

The light beam B reflected from the dichroic mirror 6A is reflected from a mirror 7A, passed through a condenser lens 8A, optically modulated through the blue liquid crystal panel block 9A, and then is incident on the light composition element 19A from the direction shown in FIG. 3.

The light beam R and the light beam G passing through the dichroic mirror 6A is incident to a dichroic mirror 10A at the subsequent stage thereof, whereat the light beam R is reflected from the dichroic mirror 10A, whereas the light beam G is passed therethrough.

The light beam R reflected from the dichroic mirror 10A is passed through the condenser lens 11A, optically modulated through the red liquid crystal panel block 12A and is then incident on the light composition element 19A from the direction shown in the figure.

The light beam G passing through the dichroic mirror 10A arrives at the condenser lens 17A through the relay lens 13A, the mirror 14A, the inverting relay lens 15A and the mirror 16A. Thereafter, it is passed through the condenser lens 17A, optically modulated through green liquid crystal panel block 18A and then incident on the light composition element 19A from the direction shown in the figure.

The light composition element 19A is also formed by combining prisms having predetermined shapes with reflection films 19A- and 19A-*b*.

Of the light beams of respective colors incident to the light composition element 19A, the light beam B is reflected from the reflection film 19A-*b* and incident to the projection lens 20. The light beam G is reflected from the reflection film 19A-*a* and incident to the projection lens 20. The light beam R is passed straight through the light composition element 19A and is then incident on the projection lens 20. As a result, the respective light beams R, G, B are composed into one light beam and incident on the projection lens 20.

1-4. Internal Construction of Projection Device (Third Embodiment)

Figure 4:
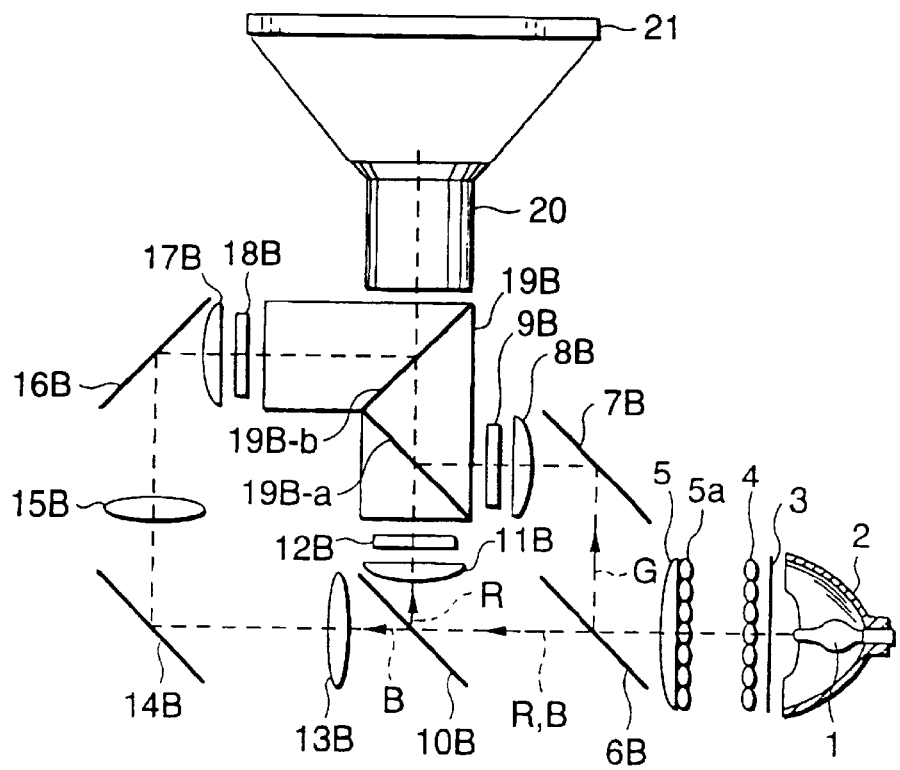
FIG. 4 is a diagram showing the construction of third embodiment of the projection device having the projection lens of the embodiment of the present invention.

FIG. 4 conceptually shows the internal construction of a third embodiment of the projection display device in which the projection lens of this embodiment can be mounted. In FIG. 4, the same parts as FIGS. 2 and 3 are represented by the same reference numerals, and the description thereof is omitted.

In this case, the light beam G is reflected by the dichroic mirror 6B, and the light beam R and the light beam B are allowed to pass therethrough.

The light beam G reflected from the dichroic mirror 6B is incident on the light composition element 19B from the direction shown in FIG. 4 through a mirror 7B, a condenser lens 8B and a green liquid crystal panel block 9B.

The light beam R and the light beam B passing through the dichroic mirror 6B are incident on the dichroic mirror 10B, and the light beam R is reflected therefrom while the light beam B is passed therethrough.

The light beam R reflected by the dichroic mirror 10B is incident through a condenser lens 11B and a red liquid crystal panel block 12B to the light composition element 19B from the direction indicated in the figure.

The light beam B passing through the dichroic mirror 10B is incident on the light composition element 19B from the direction indicated in the figure through a relay lens 13B, a mirror 14B, an inverting relay lens 15B, a mirror 16B, a condenser lens 17B and a blue liquid crystal panel block 18B in turn.

The light composition element 19B is also formed by combining a prism having a predetermined shape with reflection films 19B-*a*, 19B-*b*. In this case, of the respective color light beam incident to the light composition element 19B, the light beam G is reflected by the reflection film 19B-*a*, the light beam B is reflected by the reflection film 19B-*a*, and the light beam R is passed through the light composition element 19B while directly propagating therethrough, whereby they are incident as one light beam on to the projection lens 20.

The description on the projection device of this embodiment has been made by providing three examples. However, they are only examples, and thus various constructions may be considered as the internal construction of the projection display device in which the projection lens of this embodiment can be mounted.

2. Construction of Projection Lens

2-1. Arrangement Structure of Lens

Next, the projection lens will be described. In this case, first to third embodiments will be hereunder described as the projection lens of the present invention. The projection lenses of these first to third embodiments are used as the projection lens 20 in the projection display devices shown in FIGS. 1 to 3.

First, a common lens structure to the projection lenses 20 of the first to third embodiments will be described with reference to FIG. 5.

Figure 5:
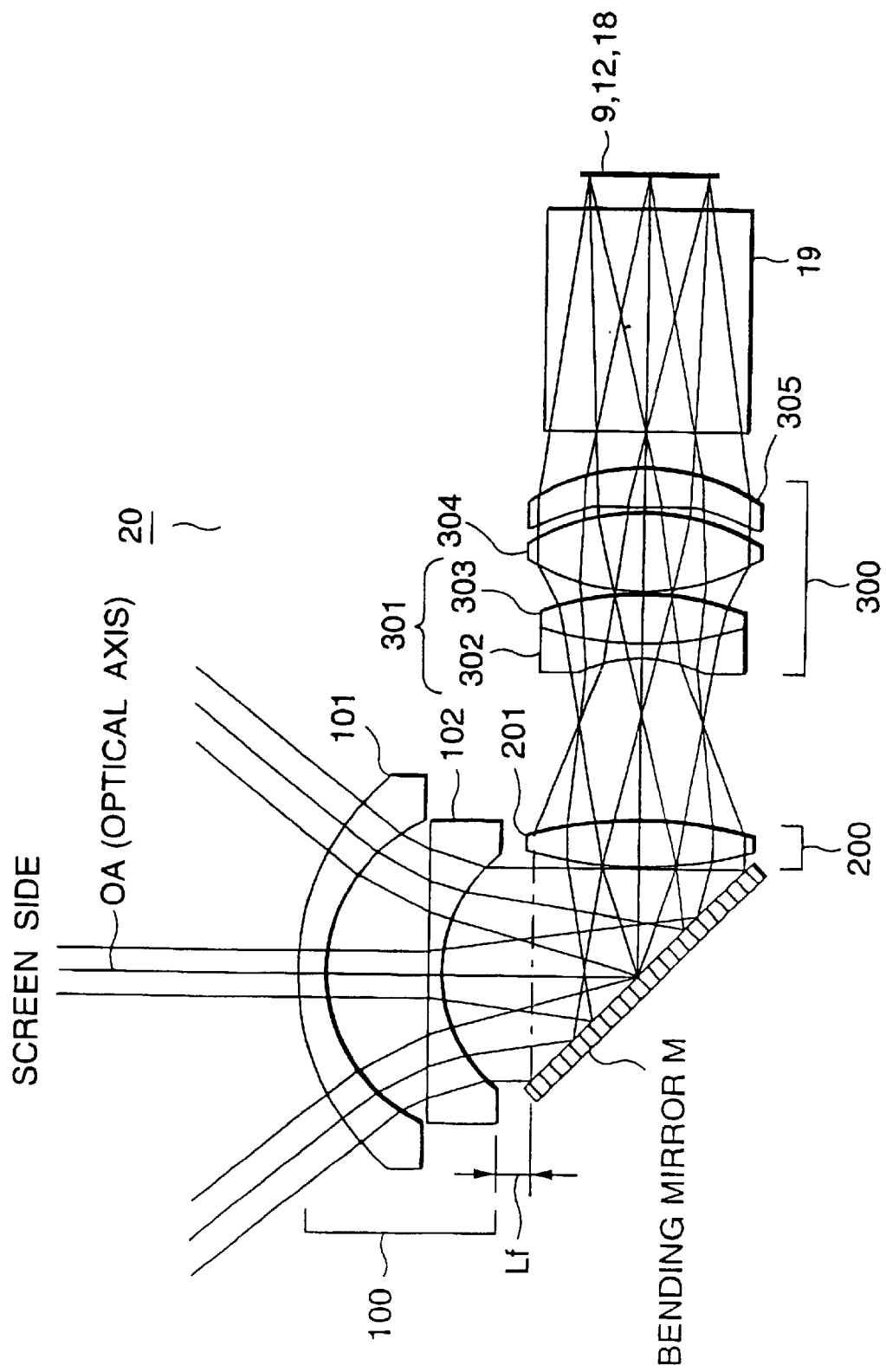
FIG. 5 is a lens cross-sectional view showing the construction of the projection lens common to the first to third embodiments.

FIG. 5 is a lens cross-sectional view which conceptually shows the lens arrangement structure of the projection lenses 20 of the first, second and third embodiments. In these figures, the left upper side of the FIG. 5 (the upper side of a mechanical lens 101) is set as a screen 21 side (long conjugate side), and the right side is set as a liquid crystal panel block and light composition element side (short conjugate side).

As the projection lens 20 shown in FIG. 5, a first lens group 100, a second lens group 200 and a third lens group 300 are successively arranged from a long conjugate side to a short conjugate side. Further, a bending mirror M is provided between the first lens group 100 and the second lens group 200.

In this case, the first lens group 100 comprises a meniscus lens 101 having a projecting shape at the long conjugate side and a concave lens 102 having a recess shape at the short conjugate side, which are arranged from the long conjugate side to the short conjugate side, thereby providing negative refractive power. Further, both the surfaces of the meniscus lens 101 have an aspherical surface which is conformed with an aspherical coefficient in a numerical value embodiment described later.

The second lens group 200 is composed of one positive lens 201 provided with positive refractive power.

In this embodiment, by satisfying a predetermined condition equation described below, the air interval or space between the second lens group 200 and the first lens group 100 can be provided so that the bending mirror M can be acommodated, and also desired performance of the projection lens can be achieved.

The third lens group 300 is composed of a composite lens 301 and a positive lens 304 from the long conjugate side, and a convex-shaped meniscus lens 305 at the short conjugate side, which are arranged as shown in the figure, whereby the third lens group 300 has positive refractive power.

Here, the composite lens 301 is formed by arranging a double-concave lens (negative lens) 302 and a positive lens 303 from the long conjugate side to the short conjugate side and laminating the convex surfaces of the double-concave lens 302 and the positive lens 303 to each other.

Further, the meniscus lens 305 has an aspherical surface indicated by the numerical value described below on both the surfaces thereof In this figure, the light composition element and the liquid crystal panel block are shown at the short conjugate side of the third lens group, however, it is conceptually illustrated that the light composition element and the liquid crystal panel block are merely located at the light incident side as a positional relationship with the projection lens.

That is, by associating the light composition element and the liquid crystal panel shown in this figure to those of FIG. 2, the light composition element 19 and the liquid crystal panel blocks 9, 12, 18 are illustrated in this figure. Likewise, if they are associated with those of FIG. 3 or 4, the light composition element 19A and the liquid crystal panel blocks 9A, 12A, 19A or the light composition element 19B an the liquid crystal panel blocks 9B, 12B, 18B would have been illustrated.

The bending mirror M is provided to reflect the light beam from the second lens group 200 therefrom and convert the direction of the optical path, and then make the light beam incident to the first lens group 100, thereby promoting the miniaturization of the cabinet of the projection display device as described above with reference to FIGS. 1A and 1B.

The bending mirror M is arranged in the projection lens 20 so as to convert the direction of the optical path of the light beam from the second lens group 200 by 90°, and in this case the following two methods may be considered by converting the direction of the optical path of the light flux from the second lens group 200 by 90°.

For example, a display area of the liquid crystal panel block is designed in a rectangular form to have a pair of long sides and a pair of short sides in association with an aspect ratio of images.

Therefore, when the optical path direction conversion is performed on the basis of the liquid crystal panel block by the bending mirror M, there may be considered a method of converting the optical path by 90° along the long-side direction of the liquid crystal panel block and a method of converting the optical path by 90° along the short-side direction.

For example, this is associated with FIG. 5, and if FIG. 5 is a designed so that the optical path is converted by 90° along the long-side direction of the liquid crystal panel block, the side edge (cross-sectional portion) of the liquid crystal panel block shown in the figure becomes the long side.

Conversely, if FIG. 5 is designed so that the optical path is converted by 90° along the short-side direction of the liquid crystal panel block, the side edge (cross-sectional portion) of the liquid crystal panel block shown in the figure becomes the short side.

In this embodiment, even when the optical path is converted in any direction of the long-side direction and the short-side direction of the liquid crystal panel block, the cabinet of the projection display device can be miniaturized, and if the construction of the projection display device shown in FIGS. 1A and 1B is used, for example, it is better to perform the optical path conversion along the long-side direction of the liquid crystal panel block. The reason is as follows.

In the case of this embodiment, the light beam of modulated image light which is incident from the liquid crystal panel block to the projection lens 20 is first reflected by the bending mirror M in the projection lens to convert the direction of the optical path, and it is further reflected by the bending mirror 504 provided to the cabinet 501 of the projection display device to convert the direction of the optical path and then incident to the screen 21.

As described above, the modulated image light from the liquid crystal panel block is projected to the screen through the two mirrors having the positional relationship shown in FIGS. 1A and 1B. At this time, the image is rotated by 90° through a process in which it passes from the liquid crystal panel block to the screen 21.

Accordingly, in the cabinet 503 of the projection device 502, the liquid crystal panel block is arranged so that the long-side direction thereof (the horizontal direction for the image) corresponds to the longitudinal direction, whereby the image is finally displayed on the screen 21 in such a proper state that the long-side direction of the image corresponds to the horizontal direction. Further, in connection with this arrangement, various optical elements constituting the other projection device 502 are arranged so that the long-side direction corresponds to the longitudinal direction.

Therefore, as this embodiment, the optical path direction of the light beam is converted by 90° along the long-side direction of the cabinet 503 which is arranged so that the long-side direction of the liquid crystal panel block and the other optical elements corresponds to the longitudinal direction.

In this case, consequently, the optical path is converted as shown in FIGS. 1A and 1B. That is, the optical path is converted to be directed upwardly with respect to the cabinet 503 of the projection device.

Here, when the projection device 502 is arranged so that the long-side directions of the parts constituting the liquid crystal panel block, the other optical elements, etc. correspond to the longitudinal direction, the short-side corresponds to the lateral direction. Therefore, as compared with the case where the it is disposed so that the short-side directions of the various parts correspond to the longitudinal direction, the width W of the cabinet 503 of the projection device 502 can be more easily reduced. Further, in accordance with the arrangement of the internal various constituent parts, the various constituent parts themselves can be miniaturized.

As described above, the miniaturization of the cabinet 503 of the projection device 502 can be performed more effectively, thereby promoting the miniaturization, particularly, a reduction in depth, of the projection display device 500.

As means of converting the optical path in the projection lens 20 it may be considered to use not only a member having a mirror structure such as the above bending mirror M or the like, but also a member using a prism or the like.

Further, when the liquid crystal panel block is used as the projection device like this embodiment, only the polarization direction of any one of S-wave and P-wave is used as light being actually used.

Therefore, when it is considered that the bending mirror M or the prism for converting the optical path in the projection lens 20 is subjected to coating in order to achieve a light reflection effect, the coating may be performed so that high reflectance is provided only in the polarization direction of any one of the S-wave and P-wave in connection with the polarization plane of the light flux which is finally emitted from the optical composition element 19, 19A, 19B.

Conversely, the optical path conversion means of this embodiment does not necessarily need any structure which can totally reflect both of S-wave and P-wave, and thus the cost can be reduced.

2-2. Condition Equation

The following condition equations (1) to (11) are satisfied in the projection lens 20 of the first to third embodiments having the above constructions.

Representing the back focus at the projection distance of infinite point by BF; the composition focus distance of all the system by F, the distance at the center between the first lens group 100 and the second lens group 200 by GD1; the composition focus distance of the first lens group 100 by F1; the composition focus distance of the second lens group 200 and the third lens group 300 by F23 and the distance at the center between the second lens group 200 and the third lens group 300 by GD2, $$2.8 < BF/F \tag{1}$$

$$3.0 < GD1/F < 4.50 \tag{2}$$

$$0.40 < -F1/F23 < 0.48 \tag{3}$$

$$0.40 < GD2/F23 < 0.8 \tag{4}$$

Representing the composition focus distance of the third lens group 300 by F3; the composition focus distance of the laminated lens 301 of the third lens group 300 by F31; the composition focus distance of the positive lens 304 of the third lens group 300 by FP32; the composition focus distance of the positive lens 304 and the aspherical lens (meniscus lens 305) of the third lens group 300 by F32; and the composition focus distance of the aspherical lens (meniscus lens 305) of the third lens group 300 by FP33, $$1.00 < -F31/F3 < 2.50 \tag{5}$$

$$0.9 < FP32/F3 < 1.40 \tag{6}$$

$$2.00 < FP33/F32 \tag{7}$$

Representing the refractive index of the negative lens (double-concave lens 302) constituting the laminated lens 301 of the third lens group 300 by N3N; the refractive index of the positive lens 303 constituting the laminated lens 301 of the third lens group 300 by N3P; the Abbe number of the positive lens 303 constituting the laminated lens 301 of the third lens group 300 by V3P; and the Abbe number of the negative lens (double-concave lens 302) constituting the laminated lens of the third lens group 300 by V3N, $$N3N - N3P > 0.15 \tag{8}$$

$$V3P - V3N > 27 \tag{9}$$

Subsequently, each of the above condition equations will be described.

For example, as is apparent from the construction shown in FIGS. 2 to 4, a long back focus is needed for the projection lens of the projection display device because an optical element such as a dichroic mirror or dichroic prism for color composition is needed.

Here, in order to reduce the size of the projection display device, that is, the housing size, it is necessary to achieve a large image frame at a short projection distance, and thus it is designed so that the angle of view of the projection lens 20 is large.

Therefore, in this embodiment, the view angle of the projection lens 20 can be set to be large by satisfying the condition equation (1) in this embodiment. Here, if the lower limit value of the condition equation (1) is exceeded, the space of the color composition system is lost.

The condition equation (2) defines a space in which the bending mirror M (or prism or the like) as the optical path conversion means is arranged in the projection lens 20 between the first lens group 100 and the second lens group 200. If the lower limit value is exceeded, the space in which the mirror or prism is placed is lost. If the upper limit value is exceeded, the total lens length is increased or the diameter of the first lens group is increased, and thus this is inconvenient.

The condition equation (3) defines the ratio between the focus composition distance of the first lens group 100 and the second lens group 200 and the composition focus distance of the second lens group 200 and the third lens group 300. This condition is used to keep the size and back focus, and the optical performance of the overall lens system in good state.

When the condition equation (3) is satisfied, the size and back focus and the optical performance of the overall projection lens system are kept excellent. Conversely, if the upper limit value of the condition equation (3) is exceeded, the construction of the inverted telescope type is weakened. Therefore, it is difficult to keep the back focus. If the length is daringly increased, the total lens length is increased or the lens diameter of the first lens group 100 is increased, and this is inconvenient.

If the lower limit value of the condition equation (3) is exceeded, the refractive power of the first lens group 100 is magnified, and curvature of image field and distortion aberration occur, so that the correction is difficult.

The condition equation (4) is used to keep the telecentricity of the out-of-axis principal light beam incident to the liquid crystal panel face by setting the distance at the center between the second lens group 200 and the third lens group 300 to a large value and keeping the height of the paraxial ray emitted from the second lens group 200 to increase the back focus, and emitting the out-of-axis principal light beam to the high position of the third lens group 300.

Here, if the upper limit value of the condition equation (4) is exceeded, this is inconvenient because various aberrations such as spherical aberration, etc. occur and thus the correction is difficult. Further, if the lower limit value of the condition equation (5) is exceeded, the back focus is shorter than a desired one or the telecentricity cannot be kept.

The condition equations (5), (6), and (7) show the arrangement and focus distance balance of lenses which are in a good aberration correction state of the out-of-axis for the second lens group 200 and the third lens group 300.

In the first lens group 100, the respective out-of-axis light beams are passed through different portions of the lens, and the refraction state of the light beam is varied by the curved surface which is varied little by little every light beam due to the aspherical lens.

The light beams from the on-axis light to the out-of-axis light in the neighborhood of the lens nearest to the liquid crystal panel block side of the second lens group 200 pass through substantially the same lens plane and emitted to the third lens group 300. The lens (positive lens 201) of the second lens group 200 is designed to guide the light beam to the laminated lens 301 of the third lens group 300.

Here, material such as glass or the like which satisfies the condition equations (8) and (9) is used for lenses, whereby the color aberration is corrected.

The condition equation (6) indicates the balance of the refractive power of the positive lens 303 in the third lens group 300.

If the upper limit value of the condition equation (6) is exceeded, the refractive power of the positive lens 303 is lowered and in order to compensate for this, loads are imposed on the other positive lenses in the first to third lens groups, so that the optical performance is deteriorated. Further, if the lower limit value of the condition equation (6) is exceeded, as the refractive power is excessively magnified, and there is a tendency that the lens thickness of the positive lens 303 is increased or the thickness of the lens periphery is lost, so that the processing of the lens is difficult.

The condition equation (7) indicates the balance of the refractive power of the aspherical lens (meniscus lens 305) in the third lens group 300.

If the lower limit value of the condition equation (7) is exceeded, the refractive power of the aspherical lens (meniscus lens 305) is excessively magnified, and the curve direction is different between the lens center and the periphery of the lens, so that the processing work becomes difficult.

The condition equation (5) indicates the refractive power of the positive lens 303 in the laminated lens 301 of the third lens group 300, and proper color correction can be performed by using glass satisfying the condition equations (8) (9).

If the upper limit value of the condition equation (5) is exceeded, the refractive power of the negative lens (double-concave lens 302) in the laminated lens 301 must be magnified. If it is excessively magnified, the color dispersion is intensified.

Conversely, if the lower limit value of the condition equation (5) is exceeded, the refractive power of the negative lens (double-concave lens 302) in the laminated lens 301 is lowered, so that correction is insufficient to the color aberration.

2-3. Focus Adjustment

Subsequently, the focus adjustment of the projection lens 20 of this embodiment will be described.

For example, in the projection display device having the construction shown in FIGS. 1A and 1B, it is necessary to perform the focus adjustment so that the projection light emitted from the projection lens 20 of the projection device 502 is focused on the screen 21.

However, as previously described as the prior art, in the case of the projection display device having the construction which converts the optical path in the projection lens, it has been found out that the image center on the screen is displaced if a so-called overall extension system is used as a focus adjustment system.

Therefore, in this embodiment, the focus adjustment is performed in the lens system on the light beam after the optical path has been converted.

That is, the focus adjustment is performed by moving only the first lens group 100 along the optical axis OA (see FIG. 5). In other words, the focus adjustment may be defined as an adjustment with which a proper value is achieved from the distance Lf between the end plane of the concave lens 102 at the shortest conjugate side in the first lens group 100 and the plane vertical to the optical axis OA passing through the upper side end portion with respect to the bending mirror M as shown in FIG. 5.

By performing the focus adjustment as described above, such a phenomenon as displacement of the image center on the screen, which is liable to occur when the overall extension system is adopted is suppressed to thereby achieve an excellent focus state.

2-4. Numerical Embodiment, Etc.

Figure 6:
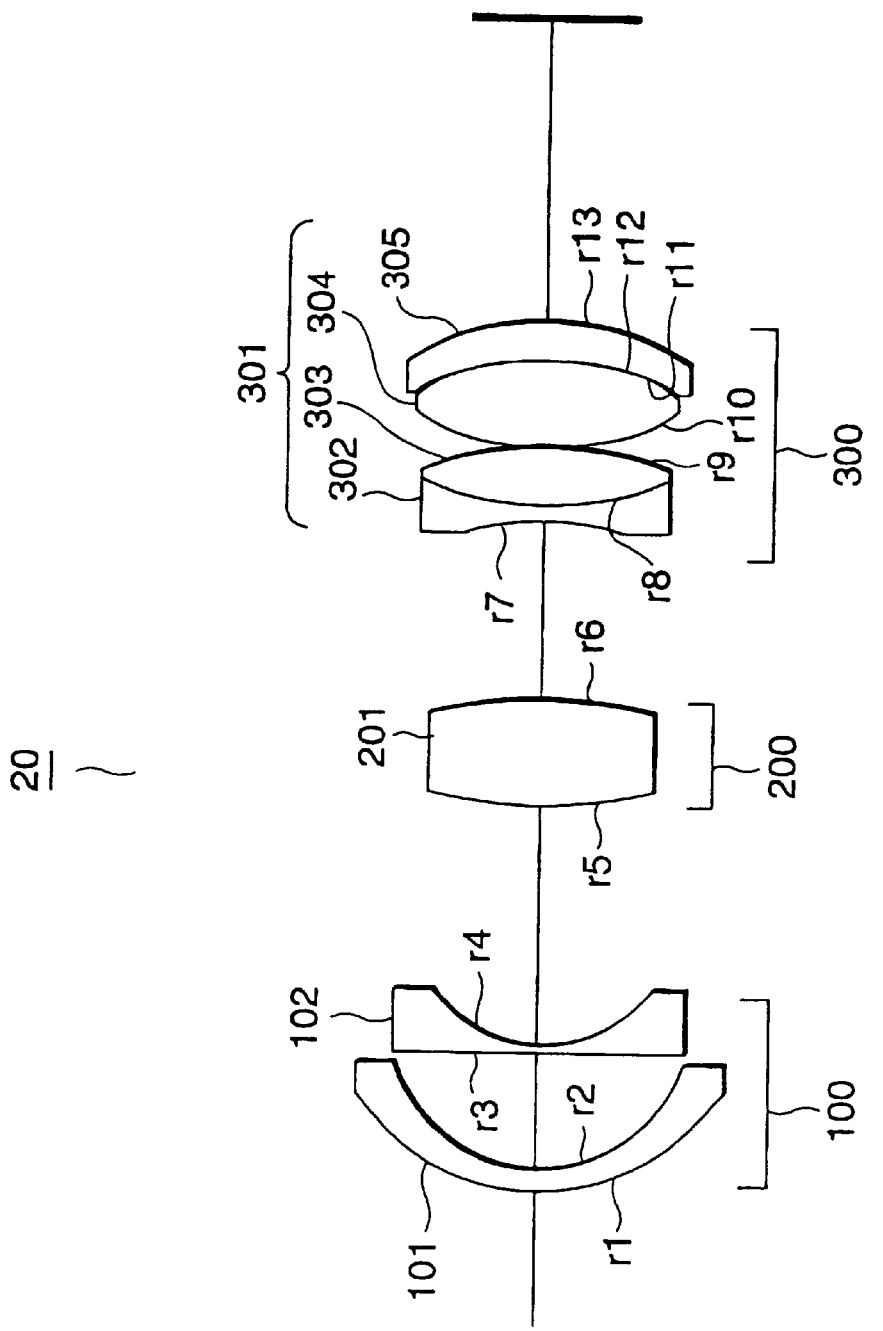
FIG. 6 is a lens cross-sectional view showing the construction of the projection lens of the first embodiment.
Figure 7:
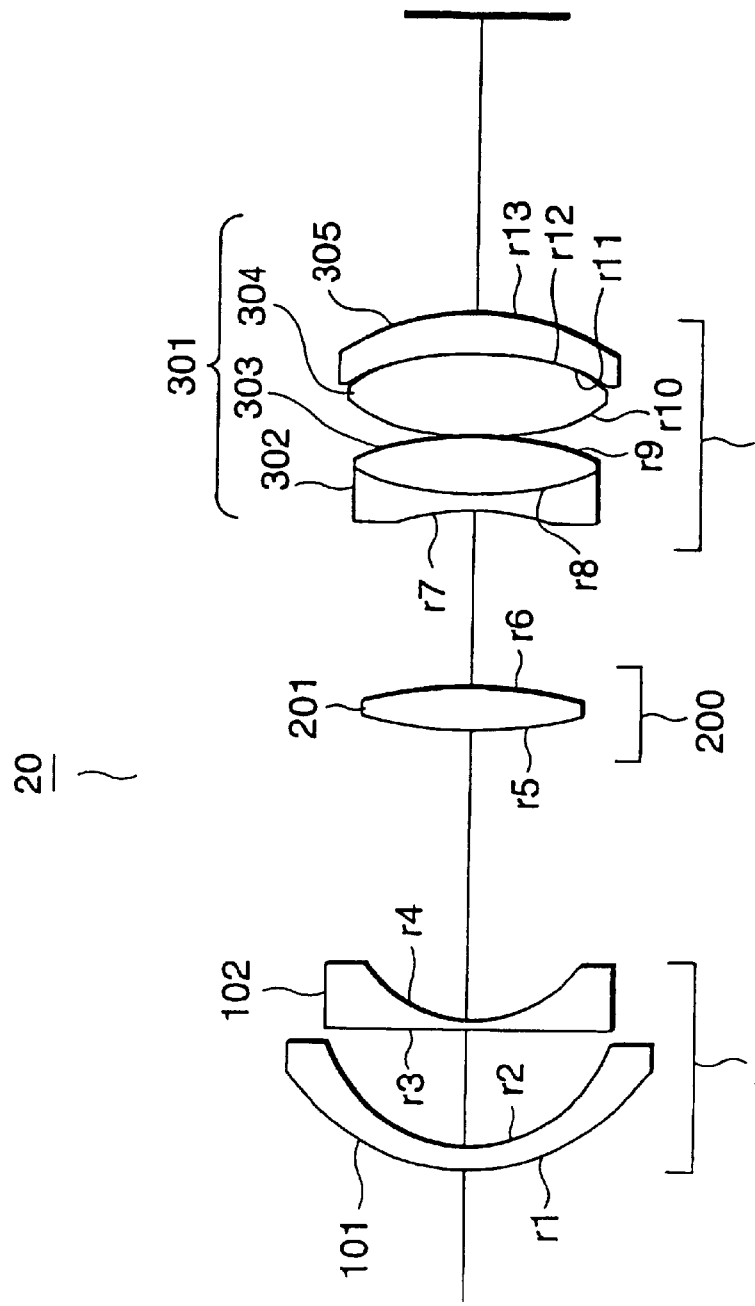
FIG. 7 is a lens cross-sectional view showing the construction of the projection lens of the second embodiment.
Figure 8:
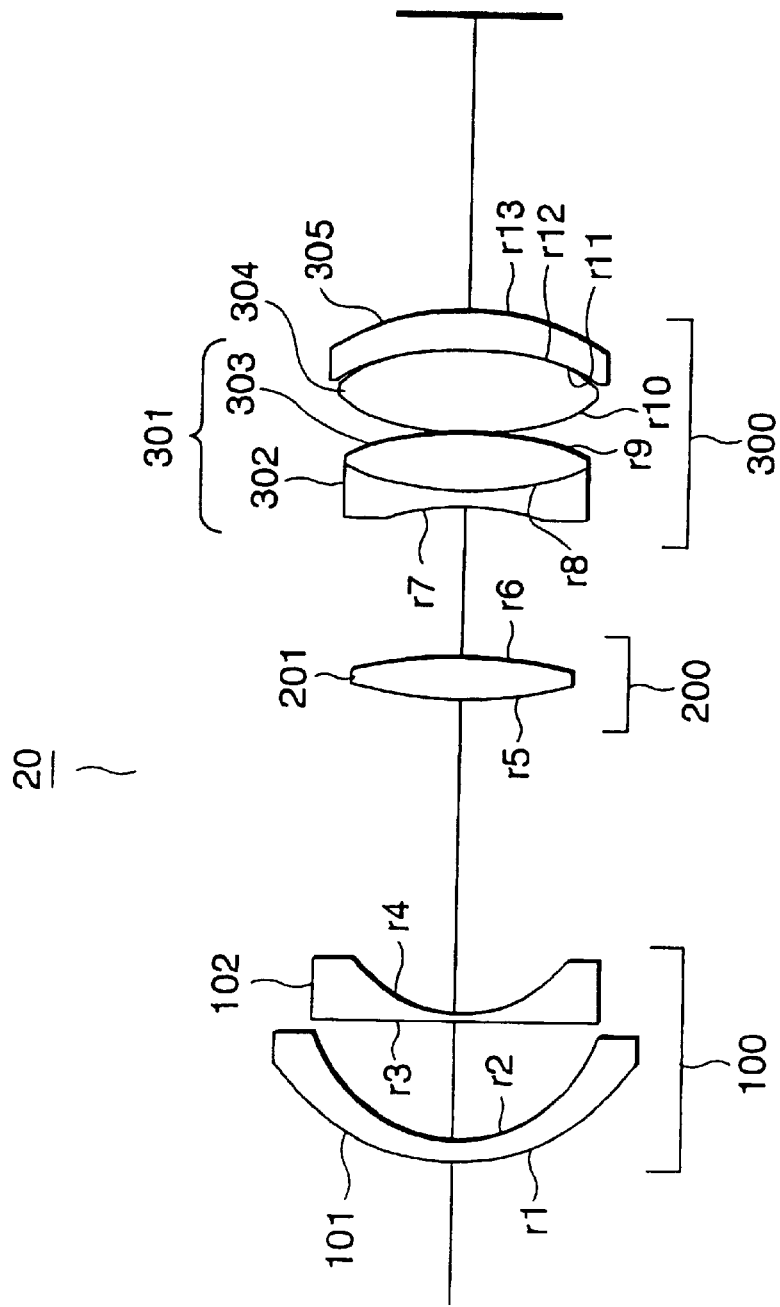
FIG. 8 is a lens cross-sectional view showing the contraction of the projection lens of the third embodiment.
Figure 12:
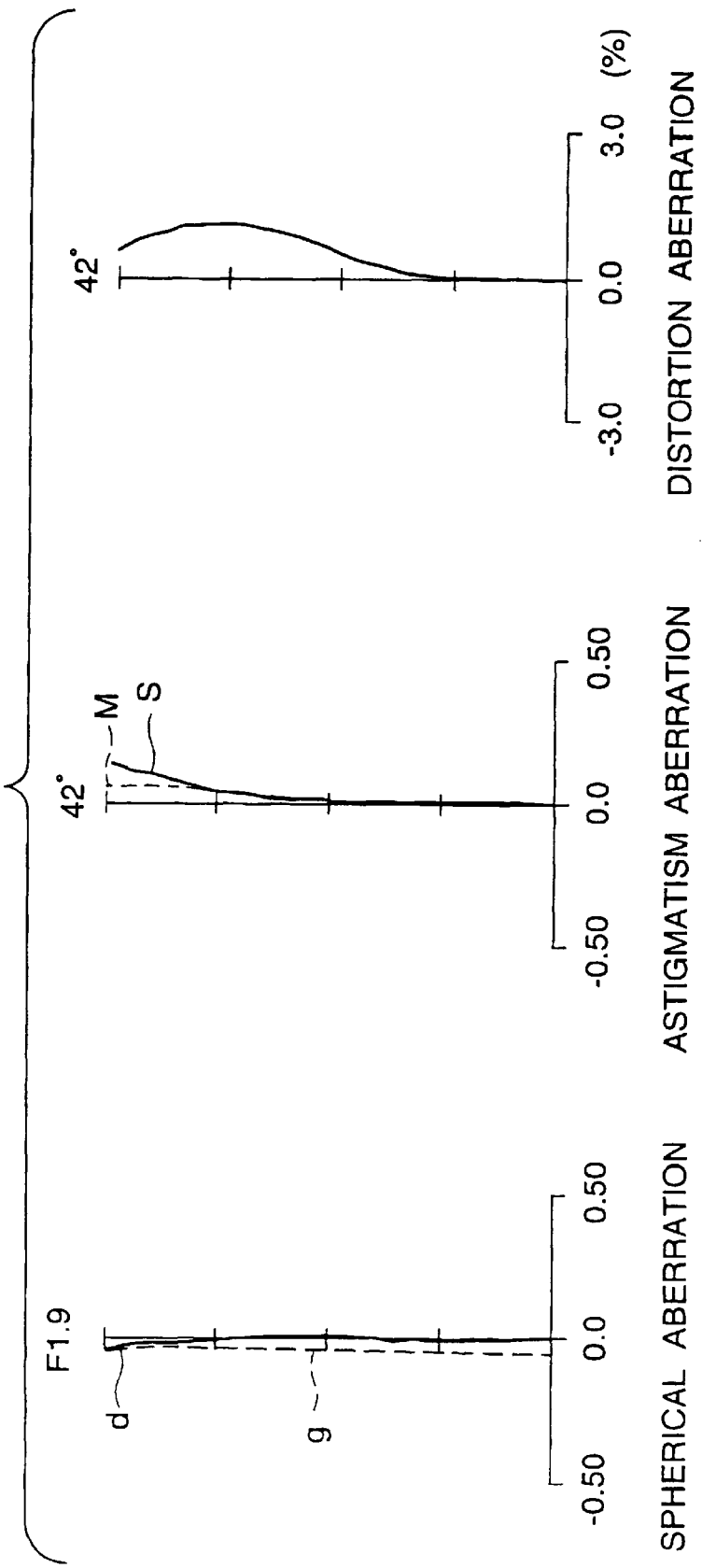
FIG. 12 is an aberration diagram showing the spherical aberration, astigmatism aberration and distortion aberration of the projection lens when the overall extension system is used as the first embodiment.
Figure 13:
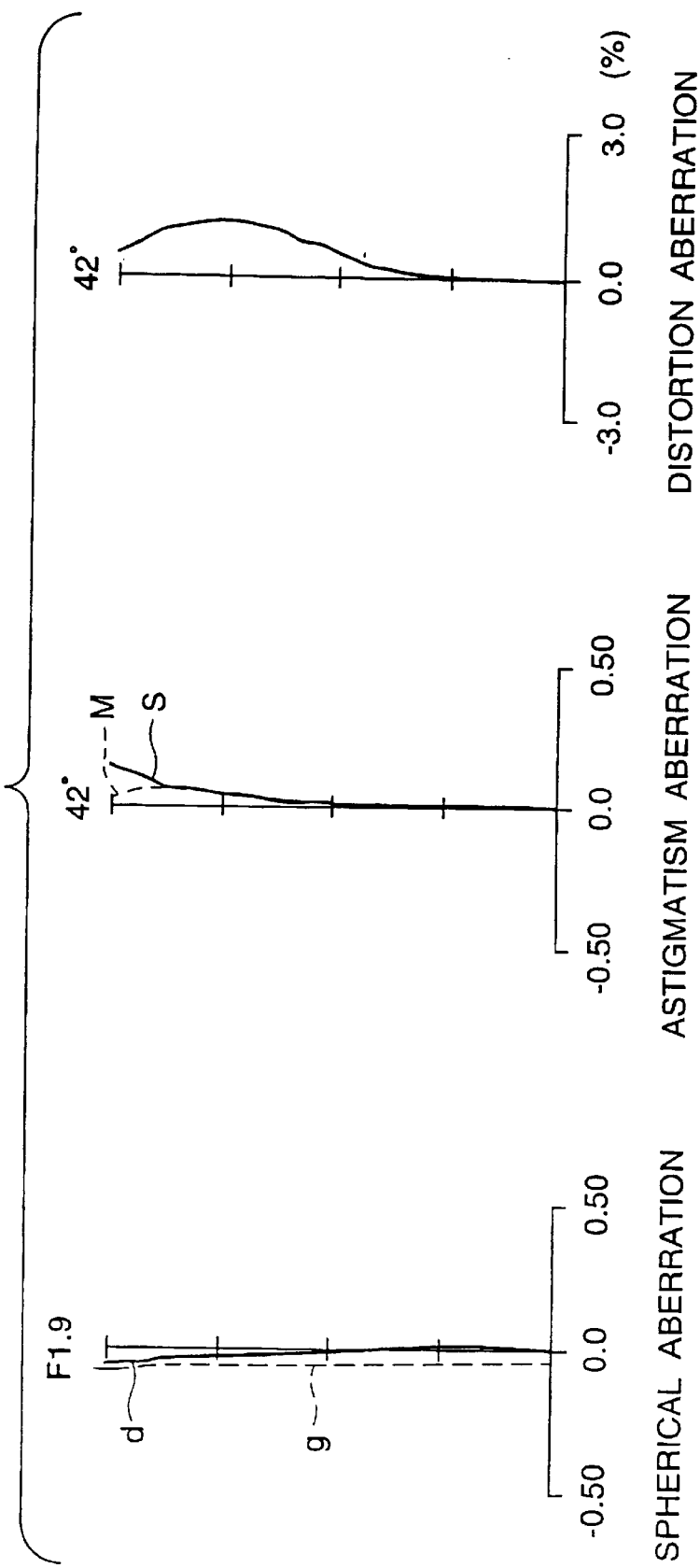
FIG. 13 is an aberration diagram showing the aspherical aberration, astigmatism aberration and distortion aberration of the projection lens when the first lens group extension system is used as the first embodiment.
Figure 14:
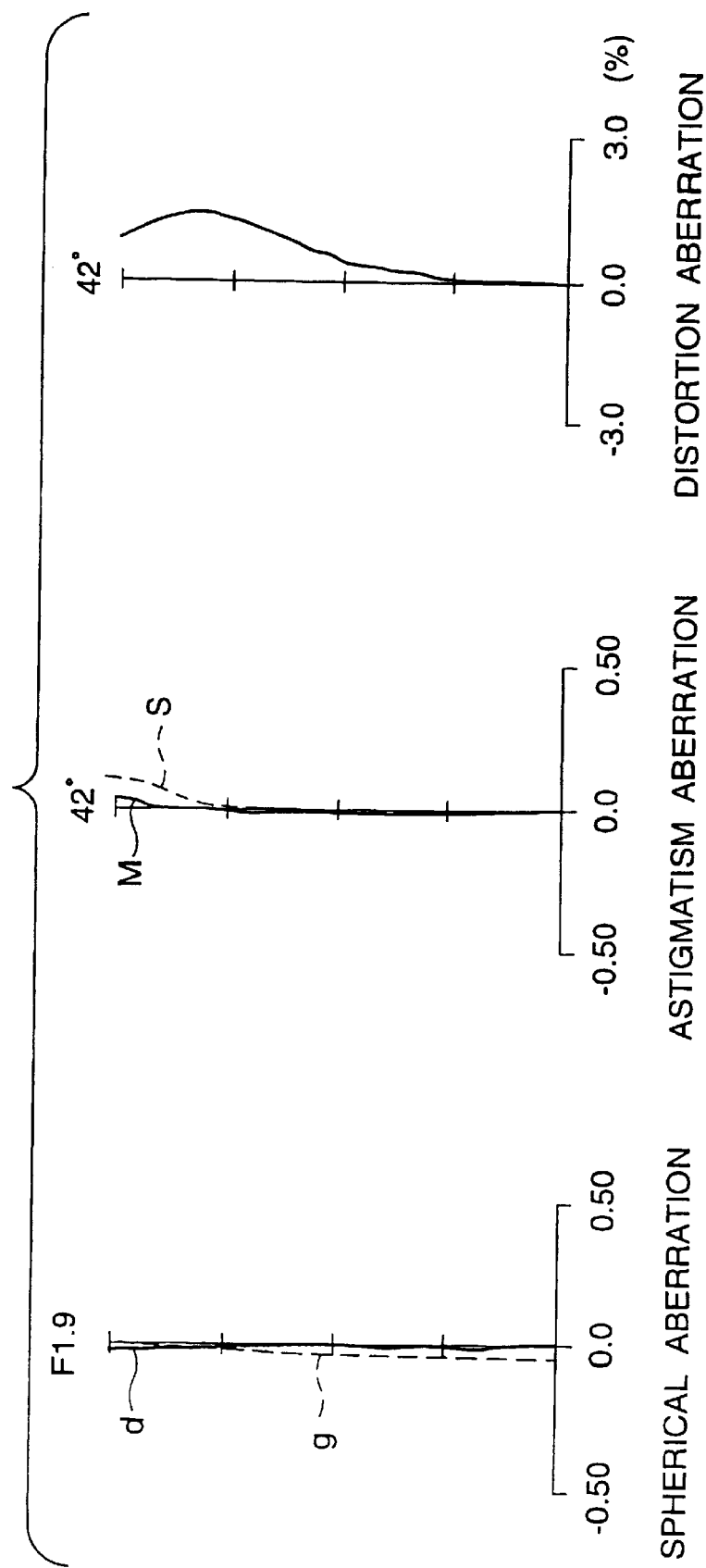
FIG. 14 is an aberration diagram showing the spherical aberration, astigmatism aberration and distortion aberration of the projection lens when the overall extension system is used as the second embodiment.
Figure 15:
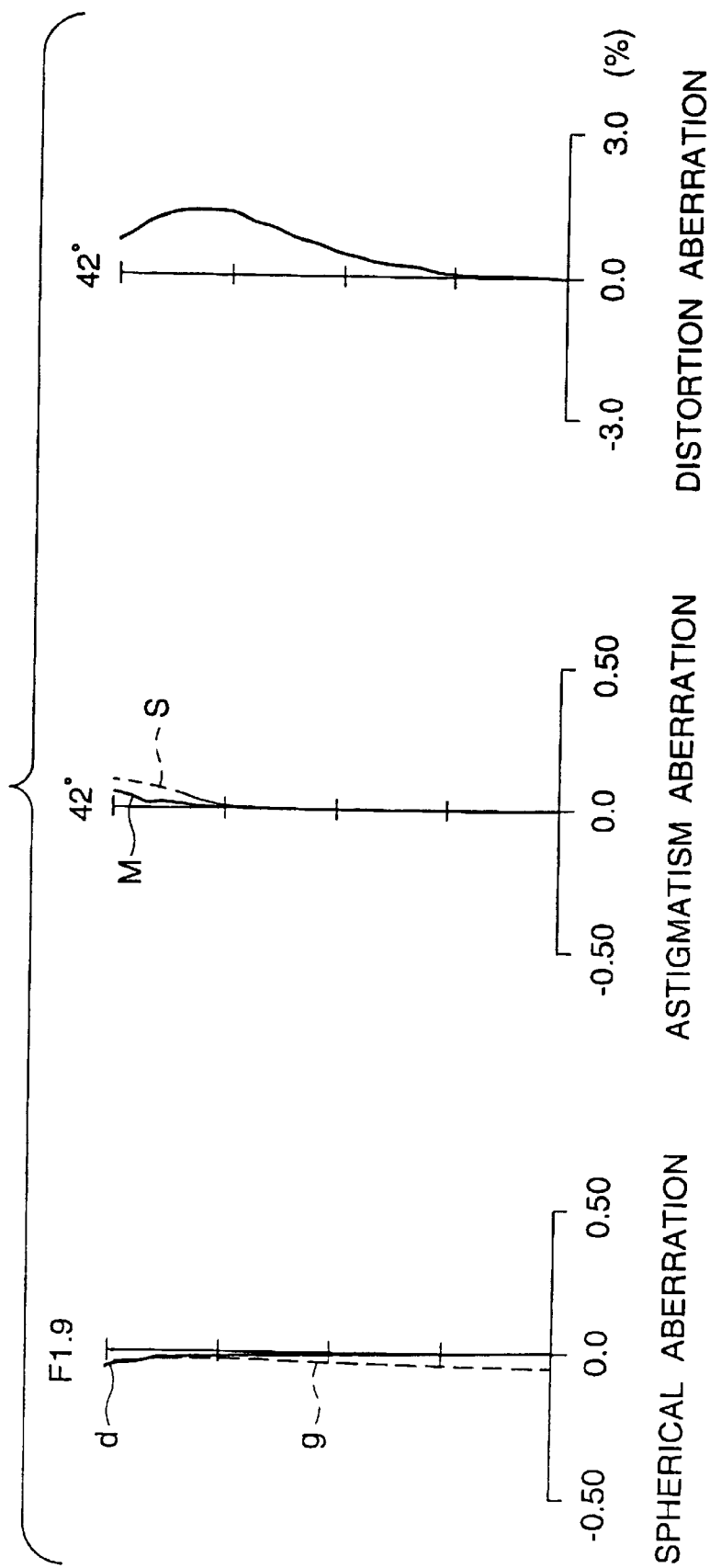
FIG. 15 is an aberration diagram showing the spherical aberration, astigmatism aberration and distortion aberration of the projection lens when the first lens group extension system is used as the second embodiment.
Figure 16:
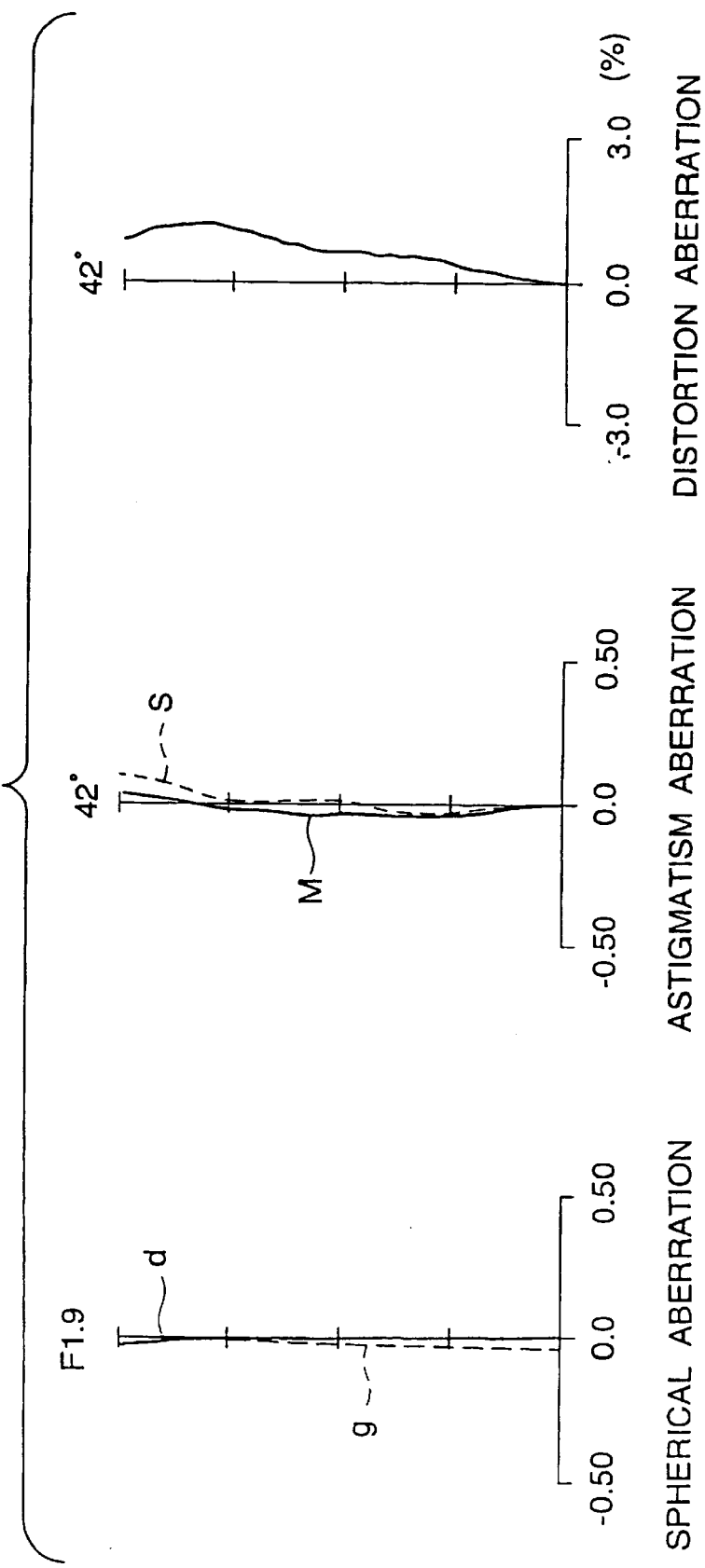
FIG. 16 is an aberration diagram showing the spherical aberration, astigmatism aberration and distortion aberration of the projection lens when the overall extension system is used as the third embodiment.

Here, the respective lens structures corresponding to numerical embodiments given to the projection lenses 20 of the first to third embodiments are shown in FIGS. 6, 7, and 8.

In these figures, the same parts as those of FIG. 5 are represented by the same reference numerals. Further, in these figures, only the lens structures corresponding to the numerical embodiments are shown, and illustration of the bending mirror M disposed between the first lens group 100 and the second lens group 200 is omitted. In addition, for convenience sake, the optical path of the light beam to be passed through each lens group is illustrated without being bent.

Here, the lens structure as each embodiment has been described with reference to FIG. 5, and thus the description thereof is omitted for each of FIGS. 6, 7 and 8.

The numerical embodiments corresponding to the first to third embodiments, that is, FIGS. 6, 7 and 8 are shown in FIGS. 9, 10 and 11.

In these figures, m represents a plane number for a lens plane which is counted from the screen 21 side (long conjugate side), ri represents an i-th radius of curvature which is counted from the screen side, di represents an i-th lens spacing, ni represents an i-th refractive index and vi represents the i-th Abbe number.

The lens spacing in each of FIGS. 9, 10 and 11 is shown for the case where the overall extension system is used as the focus adjustment system and the case where the system for moving only the above first lens group 100 along the optical axis (which is described as "first group extension" in each group) is used.

Further, the plane shape as the aspherical plane of the first plane, the second plane, the twelfth plane and the thirteenth plane is represented by the following equation wherein the center of the plane is set as an origin, r represents the central radius of curvature, k represents a cone coefficient and A4, A6, A8, A10 represent 4-order, 6-order, 8-order and 10-order aspherical plane coefficients, respectively.

$$Z = \frac{(h^2/r)}{1 + \sqrt{1 - (1+K)\cdot(h^2/r^2)}} + \sum_{i=2}^{5} A_{2i} \cdot h^{2i} \quad \text{[Equation 1]}$$

$$h = \sqrt{X^2 + Y^2}$$

With respect to each of FIGS. 12, 13, 14, 15, 16 and 17, the spherical aberration, the astigmatism and the distortion aberration for the projection lenses 20 of the first to third embodiments are compared between the case where the overall extension system is used as the focus adjustment system and the case where the system of moving only the first lens group 100 along the optical axis (first lens group extension system) is used.

In the process of obtaining the result shown in various aberration diagrams shown in the respective figures, the calculation is performed by putting a parallel planar plate having the center thickness of 35 mm (refractive index n=1.51633, Abbe number v4.0) as the light composition element 19 (19A, 19B), although not shown in the present embodiments.

The actual structure of the projection lens forming the first to third embodiments is not limited to those shown in FIGS. 6 to 8, and the number of lenses constituting each lens group may be changed insofar as the conditions described above are satisfied.

Further, in the embodiments, the projection lens of the present invention is equipped in a projection device in which a liquid crystal panel is used as a two-dimensional image display element in a back projection type projection display device, however, the present invention is not limited to these embodiments. For example, the present invention may be applied to a wide-angle photographic lens for a single-lens camera, a projection lens for a projection television using CRT, etc.

What is claimed is:

1. A projection lens system, comprising:
a first lens group having a refractive power and an aspherical surface;
a second lens group having a positive refractive power and formed so as to have at least one positive lens; and
a third lens group having a positive refractive power and an aspherical surface, wherein the first, second, and third lens groups are arranged in order from a long conjugate side to a short conjugate side;
optical path conversion means inserted between said first lens group and said second lens group for converting a direction an optical path of light flux extending from said first lens group to said second lens group and including an optical element for reflecting one of a P-wave and an S-wave;
wherein the following relationships are satisfied:

$2.8 < BF/F$ $3.0 < GD1/F < 4.50$ $0.40 < -F1/F23 < 0.48$ $0.40 < GD2/F23 < 0.8$ where BF represents a back focus at a projection distance of an infinite point,
F represents an overall focus distance of the system,
GD1 represents a center distance between said first and second lens groups,
F1 represents a focus distance of said first lens group,
F23 represents a focus distance of said second lens group and said third lens group, and
GD2 represents a center distance between said second and third lens groups.

2. The projection lens as claimed in claim 1, wherein said third lens group has at least a composite lens and a positive lens and has an aspherical surface lens at a shortest conjugate side,
wherein the following relationships are satisfied:

$1.00 < -F31/F3 < 2.50$ $0.9 < FP32/F3 < 1.40$ $2.0 < FP33/F32$ where F3 represents a focus distance of said third lens group,
F31 represents a focus distance of said composite lens of said third lens group,
FP32 represents a focus distance of said positive lens of said third lens group,
F32 represents a focus distance of said positive lens and said aspherical surface lens of said third lens group, and
FP33 represents a focus distance of said aspherical surface lens of said third lens group.

3. The projection lens as claimed in claim 1, wherein said laminated lens of said third lens group comprises a negative lens and a positive lens in a direction from the long conjugate side to the short conjugate side,
wherein the following relationships are satisfied:

$N3N-N3P > 0.15$ $V3P-V3N > 27$ where N3N represents a refractive index of the negative lens of said composite lens of said third lens group,
N3P represents a refractive index of the positive lens of said composite lens of said third lens group,
V3P represents an Abbe number of the positive lens of said composite lens of said third lens group, and
V3N represents an Abbe number of the negative lens of said composite lens of said third lens group.

4. The projection lens as claimed in claim 1, wherein said optical path conversion means is provided so that an optical path is bent along a long side of a two-dimensional image display element to be disposed at a focus position of the system of said projection lens.

5. The projection lens as claimed in claim 4, wherein the optical path is bent along the long side of said two-dimensional image display element.

6. The projection lens as claimed in claim 1, wherein said optical path conversion means is provided so that an optical path is bent along a short side of a two-dimensional image display element to be displaced at a focus position of the system of said projection lens.

7. The projection lens as claimed in claim 6, wherein the optical path is bent along the short side of said two-dimensional image display element.

8. The projection lens as claimed in claim 1, wherein said optical element of said optical path conversion means comprises a mirror for totally reflecting one of the P-wave and the S-wave.

9. The projection lens as claimed in claim 1, wherein said optical element of said optical path conversion means comprises a prism for totally reflecting one of the P-wave and the S-wave.

10. A focus adjusting method for a projection lens system having a first lens group which has a refractive power and an aspherical surface, a second lens group which has a positive refractive power and which is formed so as to have at least one positive lens, a third lens group which has a positive refractive power and an aspherical surface, said first, second, and third lens groups being arranged in order from a long conjugate side to a short conjugate side, and optical path conversion means inserted between said first lens group and said second lens group for converting a direction of an optical path of light flux which is to extend from said first lens group to said second lens group, comprising the steps of:
adjusting a focus position at the long conjugate side of said projection lens by moving said first lens group along an optical axis,
reflecting one of a P-wave and an S-wave at said optical path conversion means, and
satisfying the following relationships:

$2.8 < BF/F$ $3.0 < GD1/F < 4.50$ $0.40 < -F1/F23 < 0.48$ $0.40 < GD2/F23 < 0.8$ where BF represents a back focus at a projection distance of an infinite point,
F represents a focus distance of the system,
GD1 represents a center distance between said first and second lens groups,
F1 represents a focus distance of said first lens group,
F23 represents a focus distance of said second lens group and said third lens group, and
GD2 represents a center distance between said second and third lens groups.

* * * * *